(12) United States Patent
Kubik

(10) Patent No.: US 6,592,711 B1
(45) Date of Patent: Jul. 15, 2003

(54) DEVICE FOR PROCESSING A WEB MATERIAL USING ULTRASOUND

(75) Inventor: Klaus Kubik, Tönisvorst (DE)

(73) Assignee: Eduard Kusters Maschinenfabrik GmbH & Co., KG, Krefeld (DE)

(*) Notice: Subject to any disclaimer, the term of this patent is extended or adjusted under 35 U.S.C. 154(b) by 36 days.

(21) Appl. No.: 09/665,327

(22) Filed: Sep. 19, 2000

(30) Foreign Application Priority Data

Oct. 9, 1999 (DE) .................................. 299 17 831 U

(51) Int. Cl.[7] ............................................. B32B 31/20
(52) U.S. Cl. ................. 156/580.1; 156/73.1; 156/379.6
(58) Field of Search ........................ 156/73.1, 73.4, 156/580.1, 379.6

(56) References Cited

U.S. PATENT DOCUMENTS

| 4,635,765 A | * | 1/1987 | Schmidt | .................. | 188/266.3 |
| 4,750,955 A | * | 6/1988 | Haguenier | .................. | 156/216 |
| 4,980,213 A | * | 12/1990 | Obeda | ................ | 156/73.1 |
| 5,531,847 A | * | 7/1996 | Stewart et al. | .............. | 156/220 |

FOREIGN PATENT DOCUMENTS

GB  1018971  2/1966

OTHER PUBLICATIONS

Werner Krause, "Gerätekonstruktion" (Device Design), Heidelberg (1987), pp. 326–329.
G. Bauer, "Ölhydraulik" (Oil Hydraulics), B.G. Teubner Stuttgart (1992), pp. 150–151.

* cited by examiner

Primary Examiner—Sam Chuan Yao
(74) Attorney, Agent, or Firm—Kenyon & Kenyon

(57) ABSTRACT

A device for processing a continuously running material web includes a machine frame with an ultrasonic generator unit with a sonotrode. A counter tool lies opposite the sonotrode, affixed on the machine frame. The material web is passed through the gap between the sonotrode and the counter tool; as a drive activated by a fluid pressure medium, to press the sonotrode that is movably mounted on the machine frame against the counter tool. A damper for damping vibrations of the sonotrode in the contact pressure direction is provided. This damper is connected at one end with the sonotrode, and at its other end to the machine frame so that vibrations excited by the web or by the counter tool are damped to such an extent that they are no longer noticeable in the processing effect.

8 Claims, 2 Drawing Sheets

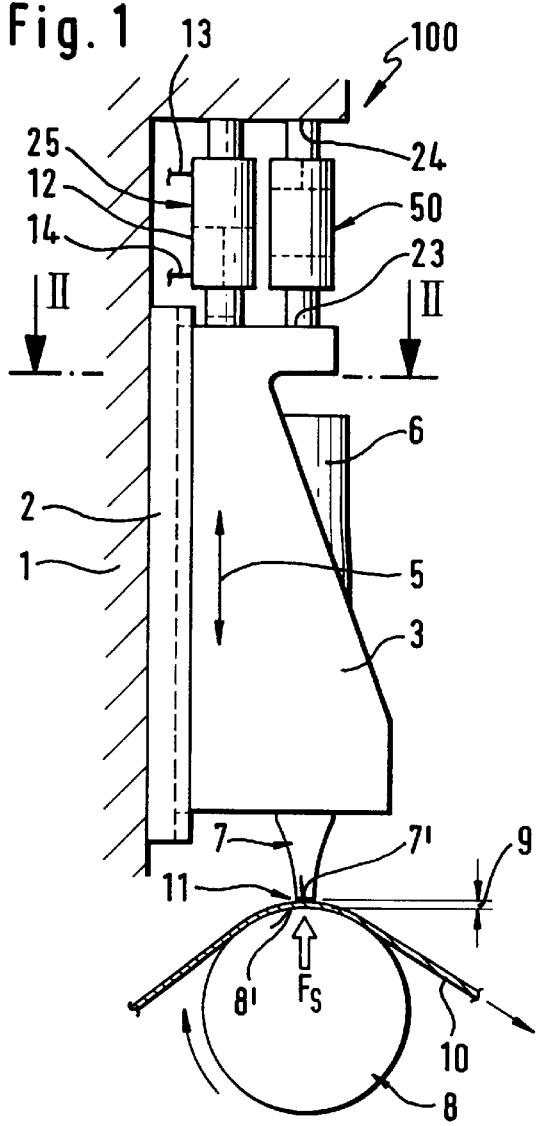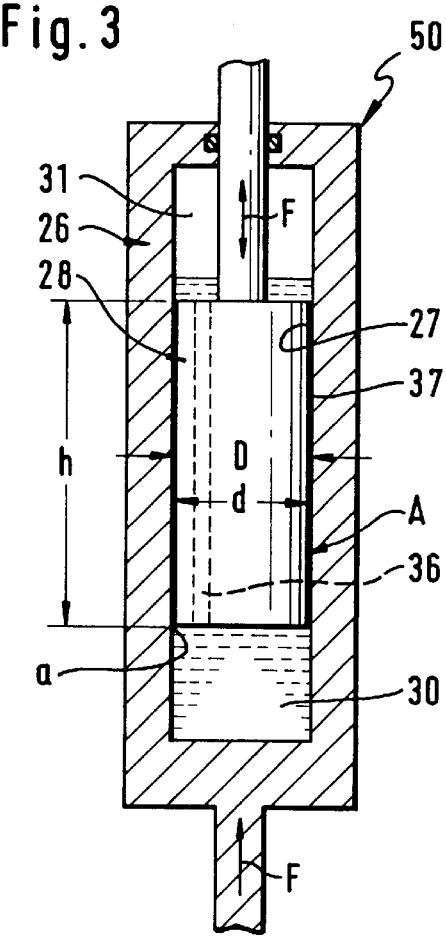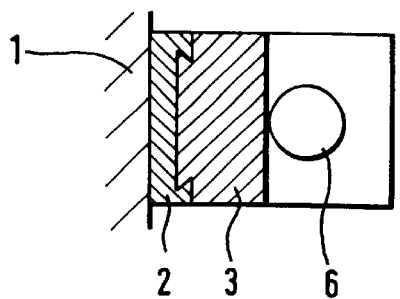

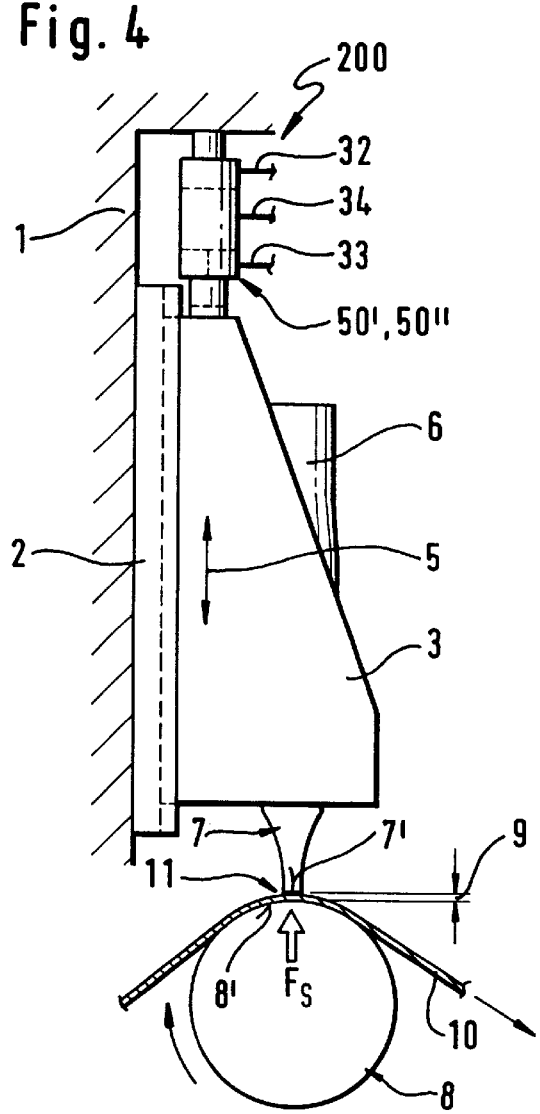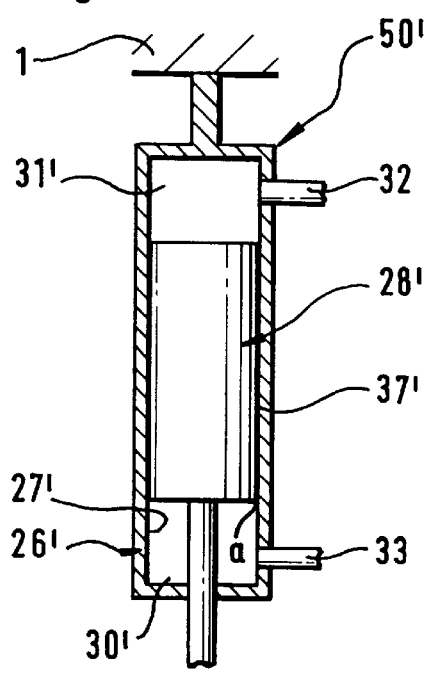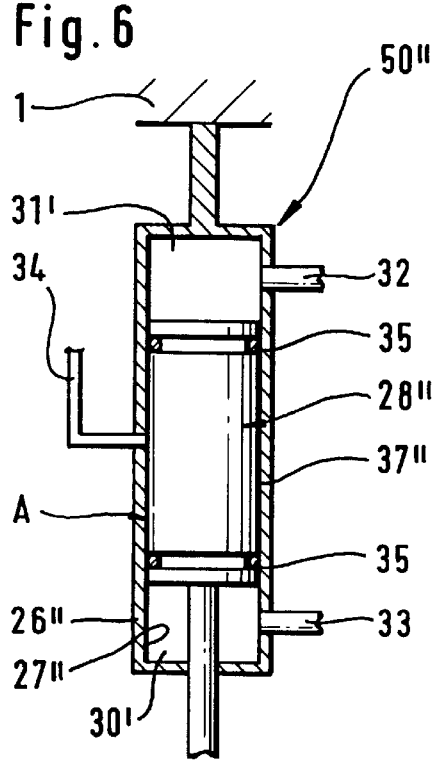

DEVICE FOR PROCESSING A WEB MATERIAL USING ULTRASOUND

BACKGROUND OF THE INVENTION

The invention relates to a device for processing a continuously running web material. Typically, the device has a machine frame, an ultrasonic generator unit that has a sonotrode which is movably mounted to the machine frame, a counter tool that lies opposite the sonotrode and which is supported on the machine frame, some means for passing the web material through the gap between the sonotrode and the counter tool, and a drive, activated by a fluid pressure medium, for pressing the sonotrode against the counter tool.

The processing tasks to which such hardware is directed include, for example, reinforcement of a nonwoven made up of thermoplastic fibers, by melting the fibers in certain spots. In this connection, the sonotrode rests on the nonwoven with a certain force, in order to ensure that the ultrasound energy is effectively introduced into the nonwoven. On the back, the nonwoven rests on the counter tool, which is structured as a counter roller, for example.

In order to achieve an optimum processing effect that remains uniform over the surface of the material web, very precise control over the distance and thus the force between the sonotrode and the counter tool (or the sheath surface of the relief affixed to it, if present) is required.

It is usual to press sonotrodes, i.e. the material web that is located between them, against the counter tool with a constant force, using pneumatic cylinders. However, the sonotrode is not supported in rigid manner in this connection, but rather via a force cushion that acts like a spring. To a certain extent, a hydraulic contact pressure system is also resilient.

Due to irregularities in the position of the nonwoven, and possibly also due to the relief pattern applied to the counter tool, i.e. the counter roller, the sonotrode may vibrate perpendicularly to the counter tool. This vibration movement has the result that the processing effect varies due to the rhythm of the vibration frequency. In other words, the nonwoven web is periodically reinforced less at one point of its length, and more at another, or might even be cut. Such irregularities are, of course, very undesirable.

SUMMARY OF THE INVENTION

The present invention is directed to the task of further developing a device of this type such that it has a more uniform processing effect. A damping device is provided to ensure that the vibrations excited by the web or the counter tool are damped to such an extent that they are no longer noticeable in the processing effect.

One such damping device is a piston/cylinder combination, attached to the sonotrode through one of the elements and to the machine frame at the other of the elements. The fluid located between the surfaces of the elements mentioned undergoes strong shear when the surfaces move relative to one another, and exerts its damping effect by internal fluid friction. For example, an arrangement of plates that are parallel to one another and lie opposite one another at a slight distance, similar to an electrical plate capacitor, is possible.

In the preferred embodiment, however, the damping device is structured as a piston/cylinder unit, where the fluid is located between the outside circumference of the piston and the inside circumference of the cylinder.

Damping devices as such are discussed in the book "Gerätekonstruktion"(Device Design), edited by W. Krause, Dr. is Alfred Hüthig Verlag, Heidelberg (1987), pages 326–328. The book "Ölhydraulik" (Oil Hydraulics) by G. Bauer Verlag B. G. Teubner, Stuttgart (1992), pages 150/151, particularly FIG. 86, shows a spindle valve that has a damping piston to prevent fluttering of the valve body, but here the damping effect comes about primarily by an overflow process resulting from a reduced cross-section.

The primary fluid that can be used is an oil, the viscosity of which is suitably selected.

The distance between the surfaces, i.e. the radial distance between the outside circumference of the piston and the inside circumference of the cylinder also depends on the viscosity. This distance can vary approximately within a range of 2 to 50 $\mu$m, where the selection depends on the size of the damping device, the desired damping effect, and, of course, on the viscosity of the oil being used, in an individual case.

According to one embodiment the damping device and the drive which is used to set the sonotrode against the counter tool or to lift it from the latter are combined in a module.

This can be accomplished, for example, by a dual-action piston/cylinder unit.

When oil is used as a fluid pressure medium, the piston can be cylindrical, without a piston ring where the piston has sufficiently small play in its cylinder so that the contact pressure movement is possible when force is exerted, but at the same time, sufficiently great play so that the fluid damping effect is possible. If, however, air is used as the fluid pressure medium for the contact pressure movement, the piston should have piston rings. Air is not suitable for achieving a sufficiently great damping effect at low vibration amplitudes. Therefore a liquid is provided as the damping medium in the space between the piston rings, which can be supplied to the interstitial space via a special feed line.

BRIEF DESCRIPTION OF THE DRAWINGS

FIG. 1 is a side view of a first embodiment of the invention;

FIG. 2 is a cross-sectional view taken along line II—II in FIG. 1;

FIG. 3 shows the damping device according to the invention in cross-section, coming out of the plane of the drawing;

FIG. 4 is a side view of another embodiment of the invention; and

FIGS. 5 and 6 show two embodiments of a drive that simultaneously acts as a damping device, in schematic form.

DETAILED DESCRIPTION OF THE INVENTION

The device, designated as a whole as 100 in FIG. 1, includes a vertical linear guide in the form of a dovetail rail 2, affixed on machine frame 1, with a first carriage 3 mounted on it, to move in the direction of arrow 5. (Where functionally equivalent parts are found in the subsequent figures, the same reference numbers are used.)

An ultrasonic generator unit 6 is affixed to carriage 3, and acts on a sonotrode 7 that is directed radially against a relief roller 8 that in turn forms the counter tool. A material web 10, which can be made up of a nonwoven of thermoplastic fibers, is passed through between face 7' of sonotrode 7 and circumference 8' of counter roller 8, through gap height 9 that is left between them. Because of the high-frequency compressions that the material experiences between the peaks of the relief of counter roller 8 and face 7' of the sonotrode, local temperature elevations occur, up to softening of the thermoplastic fibers. If the only matter of concern is reinforcement of a nonwoven, heating must be metered in such a way that the fibers just melt together, while holes in the material are avoided. If the energy supply is controlled appropriately, however, such holes can also be intentionally brought about, i.e. perforation or cutting can also take place according to the process. The amount of energy to which a specific location of the material web is exposed for the short time while it passes through gap 11 between sonotrode 7 and counter roller 8 is therefore certainly critical for the processing effect. This amount of energy depends on the force prevailing in gap 11, i.e. on gap height 9. It is plausible that the effects of the ultrasonic vibrations will become all the more obvious, the more the material web is compressed in gap 11.

A drive, designated as a whole as 25, in the form of a pneumatic piston/cylinder unit 12 with connections 13 and 14, is provided between machine frame 1 and carriage 3; it transfers its force to carriage 3 and brings about the contact pressure movement of sonotrode 7 against counter roller 8.

Drive 25 is controlled in such a way that force $F_s$ in gap 11 is kept as constant as possible. This means that the processing effect also remains constant, independent of whether or not material web 10 demonstrates variations in thickness, sonotrode 7 is subject to thermal expansion, or roller 8 bends through.

Because of the relief pattern on roller 8, and also due to irregularities of material web 10, however, it is possible that when sonotrode 7 is excited to vibrate in the direction of arrow 5, the sonotrode 7 "hammers" on roller 8, i.e. generates periodically different processing effects. In order to damp this effect, a damping device 50 in the form of a piston/cylinder unit is provided, which extends parallel to arrow 5, i.e. the vibration direction of sonotrode 7, and engages on carriage 3 at its one end, at 23, and on machine frame 1 at its other end, at 24. The way in which damping device 50 is attached serves only as an example and could be different.

The structure of damping device 50 is shown in detail in FIG. 3. It includes a closed cylinder 26, i.e. one with no feed lines, with an inside diameter D and a piston 28 that moves within it in the direction of the arrow, with an outside diameter d and an outside circumference surface 37. Piston 28 leaves play, i.e. a radial distance a, in cylinder 26, and the difference in diameters D-d is approximately 4 to 100 μm. In the axial direction, the piston has an expanse H, which is less than the length of cylinder 26. FIG. 3 shows the piston in its normal operating position, where there is play in the form of cylinder chambers 30, 31 at both face ends. Cylinder 26 is partially filled with oil, where the difference in diameters D-d and the viscosity of the oil are coordinated with one another. The amount of oil is calculated in such a way that in the normal operating position, there is oil in both chambers 30, 31. There is then an oil film in the interstitial space A between outside circumference 37 of piston 28 and inside circumference 27 of cylinder 26, which adheres to the adjacent interfaces and is subject to shear stress if piston 28 moves into cylinder 26. The shear stress results in internal friction of the oil layer and therefore in a damping effect that reduces the tendency of sonotrode 7 to vibrate. In order for damping device 50 to be able to follow the contact pressure movements, an axial bore 36 is provided in the piston, but this should not be understood as a throttle bore. The damping effect is to be very predominantly brought about by the shear within the fluid layer that surrounds piston 28.

Device 200 in FIG. 4 differs from device 100 of FIG. 1 in that damping device 50', i.e. 50" also forms the drive for the contact pressure movement of sonotrode 7 and simultaneously takes on the function of the drive indicated as 25 in FIG. 1. Damping device 50', i.e. 50" engages on carriage 3 at 23 and on machine frame 1 at 24.

Damping device 50', similar to damping device 50, includes a closed, dual-action cylinder, but this one has feed lines 32, 33 for a fluid pressure medium in cylinder chambers 30', 31', outside of the two ends of piston 28'. By feeding pressure media through the top feed lines 32, piston 28' can be moved downward. The corresponding amount of pressure medium is drawn off through bottom feed line 33.

In the embodiment shown according to FIG. 5, oil is provided as the fluid pressure medium; it is distributed over the circumference surface of piston 28' as a film and there is subject to the damping shear effect. Piston 28' is structured as a simple cylindrical piston without piston rings. In order for an uninterrupted fluid layer to be present on the circumference of piston 28', the difference between inside diameter D of cylinder 26' and outside diameter d of piston 28' must have a certain magnitude, in order to prevent metallic friction. In the design shown in FIG. 5, this can be accomplished only by using viscous oil as the fluid pressure medium. On the other hand, distance a between outside circumference 37' of piston 28' and inside circumference 27' of cylinder 26' is so small that the pressure necessary to press sonotrode 7 against its counter part can build up in chambers 31', 32'.

In the embodiment shown in FIG. 6, on the other hand, the fluid pressure medium is air. Because of its significantly lower viscosity, this air would exit along piston 28', i.e. blow through without effect, without being able to bring about the necessary contact pressure force. For this reason, when using air as the fluid pressure medium, it is necessary to provide piston rings 35, 35 on piston 28", in the vicinity of its two ends. However, even in this embodiment, the damping effect aimed at is provided by the oil located in interstitial space A between outside circumference 37" of piston 28" and inside circumference 27" of cylinder 26". A feed line 34 empties into the region between piston rings 35, 35, with the oil being passed through it, so that the damping oil film is maintained over the entire circumference of piston 28, between piston rings 35, 35. In other words, the movement of sonotrode 7 for contact pressure is generated by the force, while damping is produced by the oil.

What is claimed is:

1. An apparatus for processing a continuously running web material, comprising:
   a machine frame;
   an ultrasonic generator unit that has a sonotrode which is movably mounted to the machine frame;
   a counter tool that lies opposite the sonotrode and which is supported on the machine frame, the counter tool and the sonotrode being spaced apart so as to define a gap there between;
   means for passing the web material through the gap between the sonotrode and the counter tool;
   a drive, activated by a fluid pressure medium, for pressing the sonotrode against the counter tool; and
   a device for damping vibrations of the sonotrode along the direction to the counter tool, this device being connected at one end to the sonotrode and at another end to the machine frame.

2. The apparatus according to claim 1, wherein the damping device includes at least one first element connected to the sonotrode, and at least one second element connected with the machine frame, which lie opposite one another at surfaces with a slight distance between them so as to define an interstitial space there between, the interstitial space being filled with a fluid.

3. The apparatus according to claim 2, wherein the damping device is designed as a piston/cylinder unit, and wherein the fluid is present in the interstitial space between the outer periphery of the piston and the inner periphery of the cylinder.

4. The apparatus according to claim 3, wherein the fluid is an oil.

5. The apparatus according to claim 3, wherein the piston is offset from the cylinder between 2 to 50 $\mu$m.

6. The apparatus according to claim 4, wherein the piston is offset from the cylinder between 2 to 50 $\mu$m.

7. The apparatus according to claim 1, wherein the damping device and the drive are combined into a module.

8. An apparatus for processing a continuously running web material, comprising:

a machine frame;

an ultrasonic generator unit that has a sonotrode which is movably mounted to the machine frame, a counter tool that lies opposite the sonotrode and which is supported on the machine frame, the counter tool and the sonotrode being spaced apart so as to define a gap there between;

means for passing the web material through the gap between the sonotrode and the counter tool;

a drive, activated by a fluid pressure medium, for pressing the sonotrode against the counter tool; and a device for damping vibrations of the sonotrode along the direction to the counter tool, this device being connected at one end to the sonotrode and at another end to the machine frame, wherein the damping device is designed as a piston/cylinder unit, and wherein the fluid is present in the interstitial space between the outer periphery of the piston and the inner periphery of the cylinder, wherein the piston is offset from the cylinder between 2 to 50 $\mu$m, and wherein the damping device and the drive are combined into a module that comprises a dual-action piston/cylinder unit that is provided at its two ends with feed lines for a fluid pressure medium that brings about contact pressure movement.

* * * * *